US009722815B2

(12) United States Patent
Mukundan et al.

(10) Patent No.: US 9,722,815 B2
(45) Date of Patent: Aug. 1, 2017

(54) EDGE-GATEWAY MULTIPATH METHOD AND SYSTEM

(71) Applicants: Sunil Mukundan, Chennai (IN); Stephen Craig Connors, Sunnyvale, CA (US); Steven Michael Woo, Los Altos, CA (US); Ajit Ramachandra Mayya, Saratoga, CA (US); Thomas Harold Speeter, San Martin, CA (US)

(72) Inventors: Sunil Mukundan, Chennai (IN); Stephen Craig Connors, Sunnyvale, CA (US); Steven Michael Woo, Los Altos, CA (US); Ajit Ramachandra Mayya, Saratoga, CA (US); Thomas Harold Speeter, San Martin, CA (US)

(*) Notice: Subject to any disclaimer, the term of this patent is extended or adjusted under 35 U.S.C. 154(b) by 444 days.

(21) Appl. No.: 14/321,818

(22) Filed: Jul. 2, 2014

(65) Prior Publication Data
US 2015/0016249 A1 Jan. 15, 2015

Related U.S. Application Data

(60) Provisional application No. 61/844,822, filed on Jul. 10, 2013.

(51) Int. Cl.
H04L 12/66 (2006.01)
H04L 12/707 (2013.01)
H04L 12/26 (2006.01)
H04L 12/801 (2013.01)
H04L 12/803 (2013.01)
(Continued)

(52) U.S. Cl.
CPC .......... *H04L 12/66* (2013.01); *H04L 41/5041* (2013.01); *H04L 41/5096* (2013.01); *H04L 43/0894* (2013.01); *H04L 45/24* (2013.01); *H04L 47/125* (2013.01); *H04L 47/15* (2013.01); *H04L 47/2408* (2013.01)

(58) Field of Classification Search
CPC ............................... H04L 45/22; H04L 45/04
See application file for complete search history.

(56) References Cited

U.S. PATENT DOCUMENTS 9,450,817 B1 * 9/2016 Bahadur ............. H04L 41/0813
2003/0202506 A1 † 10/2003 Perkins
(Continued)

Primary Examiner — Mark Rinehart
Assistant Examiner — Matthew Hopkins

(57) ABSTRACT

In one exemplary aspect, an edge-gateway multipath method includes the step of providing an edge device in a local network communicatively coupled with a cloud-computing service in a cloud-computing network. A set of wide area network (WAN) links connected to the edge device are automatically detected. The WAN links are automatically measured without the need for an external router. The edge device is communicatively coupled with a central configuration point in the cloud-computing network. The method further includes the step of downloading, from the central configuration point, an enterprise-specific configuration data into the edge device. The enterprise-specific configuration data includes the gateway information. The edge device is communicatively coupled with a gateway in the cloud-computing network. The communicatively coupling of the edge device with the gateway includes a multipath (MP) protocol.

11 Claims, 10 Drawing Sheets

(51) Int. Cl.
*H04L 12/851* (2013.01)
*H04L 12/24* (2006.01)

(56) References Cited

U.S. PATENT DOCUMENTS

2006/0182034 A1 † 8/2006 Klinker
2012/0300615 A1* 11/2012 Kempf ................. H04W 24/02
370/216
2013/0021968 A1 † 1/2013 Reznik

* cited by examiner
† cited by third party

EDGE-GATEWAY MULTIPATH METHOD AND SYSTEM

CROSS-REFERENCE TO RELATED APPLICATIONS

This application is a claims priority to U.S. provisional patent application No. 61/844,822, titled EDGE-GATEWAY MULTIPATH METHOD AND SYSTEM and filed on Jul. 10, 2013. Thus provisional application is hereby incorporated by reference in its entirety.

BACKGROUND

Several trends are altering the use of enterprise applications. For example, enterprises are moving to hosting applications in private and public clouds as opposed to enterprise data centers. Enterprises are also increasingly using applications provided by other companies which are generically grouped under SaaS (Software-as-a-Service) and are not hosted in the enterprise data center. In another example, enterprises are migrating from large IT supported branches to smaller branches. These smaller branches can utilize remote IT management. These trends have combined to alter applications network paths and/or the quality of service (QoS) of these paths. With enterprise data-center applications, the large IT branches can lease multiprotocol label switching (MPLS) lines. MPLS can be mechanism in communications networks that directs data from one network node to the next node based on short path labels rather than long network addresses, thus avoiding complex lookups in a routing table. MPLS lines can be associated with a known level of QoS that provides a deterministic application access experience and/or application availability. Applications are moving to the cloud where they are deployed either in the public or hybrid cloud. Enterprise branches access these applications via the public Internet. Access to these applications in such cases may be hampered by the 'best effort' nature of access as opposed to having a known QoS level. Additionally, a smaller branch may also utilize computing devices that are relatively easy to deploy and/or remotely manage in the event no on-site IT staff is available.

BRIEF SUMMARY OF THE INVENTION

In one aspect, an edge-gateway multipath method includes the step of providing an edge device in a local network communicatively coupled with a cloud-computing service in a cloud-computing network. A set of wide area network (WAN) links connected to the edge device are automatically detected. The WAN links are automatically measured without the need for an external router. The edge device is communicatively coupled with a central configuration point in the cloud-computing network. The method further includes the step of downloading, from the central configuration point, an enterprise-specific configuration data into the edge device. The enterprise-specific configuration data includes the gateway information. The edge device is communicatively coupled with a gateway in the cloud-computing network. The communicatively coupling of the edge device with the gateway includes a multipath (MP) protocol.

A deep-packet inspection engine can be utilized to identify the application and application type in a multipath network flow. The edge device can be a virtual machine edge device. The gateway can be deployed as a virtual machine gateway. The edge device can identify an application and determine the proper quality of service (QoS) methods to apply when the edge device initially communicatively couples with the gateway and communicates a control message to the gateway. The gateway may have no initial setup configuration. The edge device can pass its enterprise identification and a local configuration to the gateway. The gateway uses the initial setup configuration to automatically create multiple isolated configurations-per-enterprise.

BRIEF DESCRIPTION OF THE DRAWINGS

The present application can be best understood by reference to the following description taken in conjunction with the accompanying figures, in which like parts may be referred to by like numerals.

The Figures described above are a representative set, and are not an exhaustive with respect to embodying the invention.

DETAILED DESCRIPTION

Disclosed are an edge-gateway multipath system, method, and article of manufacture. Although the present embodiments have been described with reference to specific example embodiments, it can be evident that various modifications and changes may be made to these embodiments without departing from the broader spirit and scope of the particular example embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, attendee selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labelled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A. Example Methods and Systems

Figure 1:
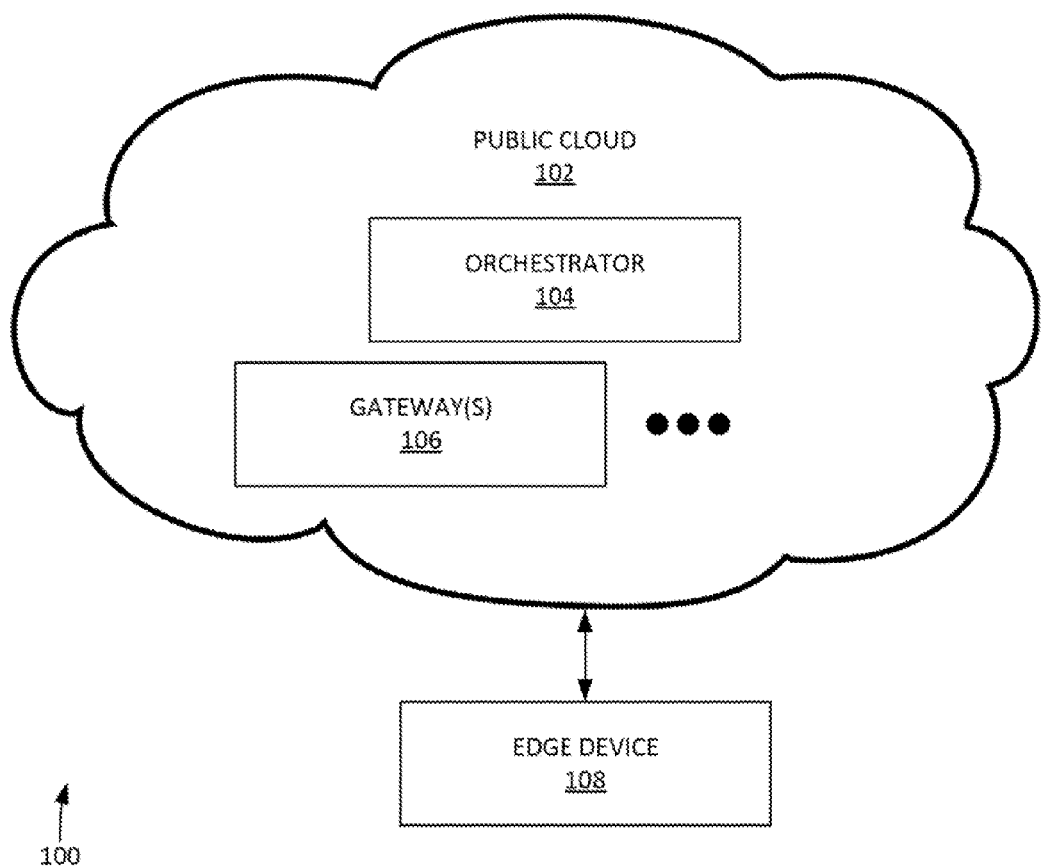
FIG. 1 illustrates an example a programmable, multi-tenant overlay network, according to some embodiments.

FIG. 1 illustrates an example of a programmable, multi-tenant overlay network 100, according to some embodiments. An overlay network can be a computer network built on the top of another network. Overlay network 100 can include a distributed system such as a cloud computing network (e.g. public cloud 102). Public cloud 102 can include a cloud-computing network. In some embodiments, public cloud 102 can be implemented, in whole or in part, as a private cloud-computing network (e.g. a proprietary network or data center that uses cloud computing technologies). In other embodiments, the public cloud 102 can include SaaS (Software-as-a-Service) companies 109 which provide applications to enterprises and end-consumers. As used herein, a cloud-computing network can include a computer network(s) that utilizes a variety of different computing concepts that involve a large number of computers connected through a real-time communication network (e.g. the Internet). A public cloud can include a set of computers and computer network resources based on the standard cloud computing model, in which a service provider makes resources, such as applications and storage, available to the general public over the Internet. Applications, storage, and other resources can be made available by a service provider.

Public cloud 102 can include orchestrator 104 (e.g. a Velocloud® orchestrator). Orchestrator 104 can enable configuration and monitoring of the network from any location with Internet access. Orchestrator 104 can be a central controller for configuring and monitoring a multi-tenant instance of the overlay network described by a unique 'network ID'. Each such instance can have a set of tenant(s) that have tenant specific policies for sharing resources, access control and configuration. A tenant can then have a 'tenant-id' which is used to identify tenants in the network. Multiple independent instances of networks can exist so as to enable self-operated overlay networks similar to the public network.

In this context, an orchestrator 104 can perform various functions such as configuration and monitoring. Orchestrator 104 can enable role based configuration and management. The following can be examples of roles. An 'end-user' (e.g. maps to an access device like laptop or mobile device) that connects to an edge device 108 that can be enabled to configure and/or monitor resources and policies that are specific to a user. A 'tenant administrator' can be a tenant administrator. A tenant administrator can configure tenant-wide policy and by extension policies for all the users in the tenancy. An 'operator' that can operate the overlay network by provisioning gateway(s) 106, edge device(s) 108 and/or other resources for the network (e.g. may not be able to view or modify tenant policies).

In addition to this, the orchestrator 104 can also enable 'authenticated partners' to modify the behavior of the network (e.g. application service providers who want to reserve extra bandwidth for some applications sessions etc.) via published application program interface (APIs).

Public cloud 102 can include gateway(s) 106. A gateway can be a network node equipped for interfacing with another network utilizing different communication protocols. Gateway(s) 106 can be deployed in a public cloud (e.g. as shown in FIG. 1), a private cloud, Internet service provider (ISP) peering points and/or application service peering points that serve as aggregation points for multiple edges. Gateway(s) 106 can be located at peering points in public cloud 102.

Edge device 108 can provide entry points into enterprise or service provider core networks. Example edge devices can include routers, routing switches, integrated access devices (IADs), multiplexers, and a variety of metropolitan area network (MAN) and wide area network (WAN) access devices. Edge device 108 can be deployed inline in one of several modes. In one example, edge device 108 can be deployed as a customer premises equipment (CPE) device in a branch that is capable of serving as a router. In one example, edge device 108 can be deployed as a powered mobile device that can be attached to end-user devices (e.g. laptops, desktops, wearable computers, tablet computers and the like via universal serial bus (USB)). In some examples, edge device 108 can include device software that directly interacts with a host device operating system. In one example, the edge device 108 may be a virtual machine. A virtual machine can be a software-based emulation of a computer. In some examples, edge device 108 and the gateway(s) 106 can straddle the 'bottleneck' section of a communication network (e.g. the 'last-mile'—a final leg of a communication networks delivering communications connectivity to a network host such as an enterprise computing system). In some embodiments, edge device 108 can be characterized as 'zero touch' (e.g. no configuration explicitly required at client side). Accordingly, edge device can automatically detect an available wide area network (WAN) and locate orchestrator 104.

Figure 2:
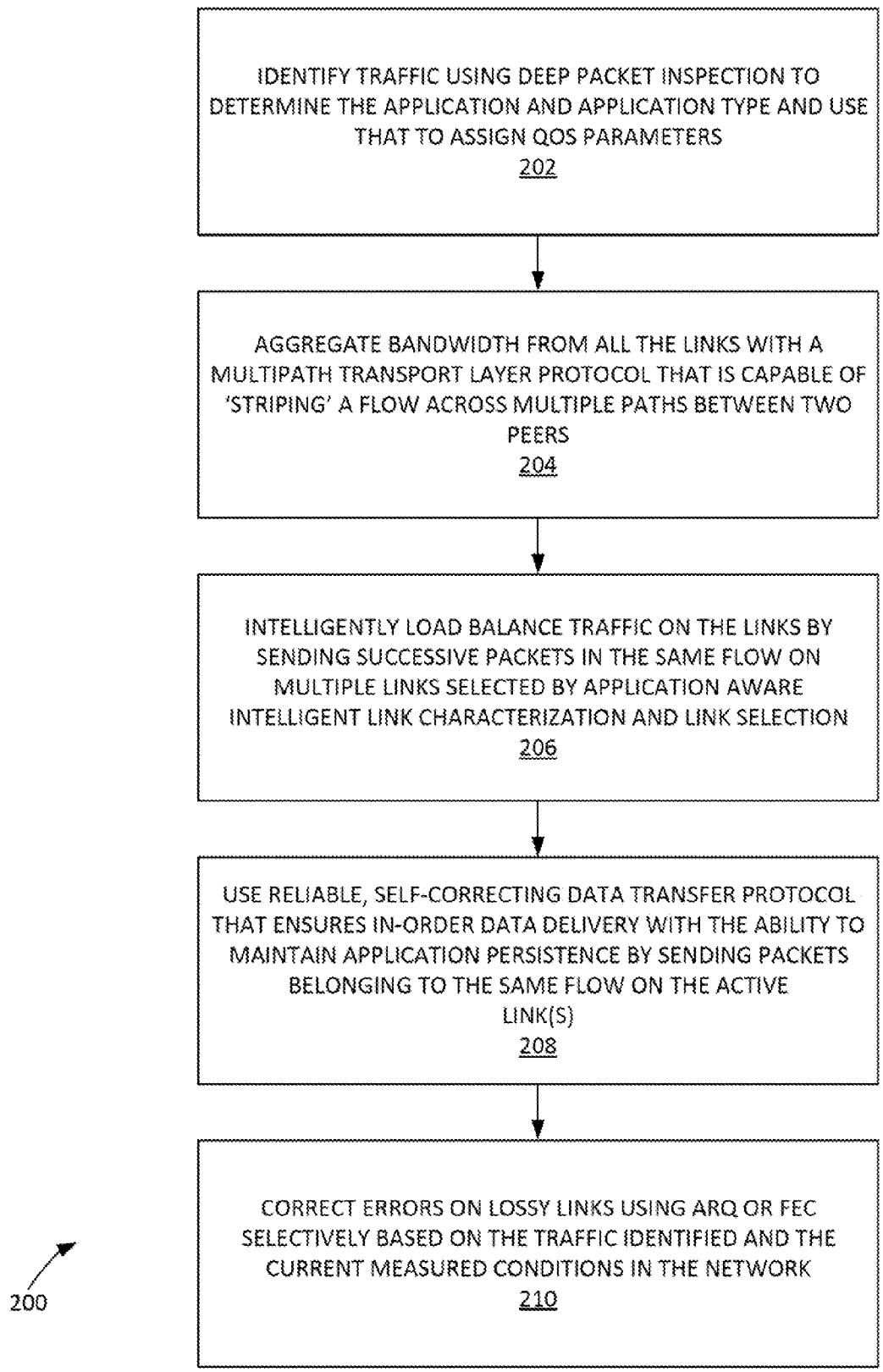
FIG. 2 depicts a process of a network link used to replace 'last mile' connectivity, according to some embodiments.

The edge device 108 sends network packets, which may be control packets, data packets or management packets. Control packets or control traffic is used to sense the quality of the path, link characteristics, clock synchronization etc. This is also known as the control plane. Data packets or data traffic are packets that are being sent from the client or source computer to the application server running in the enterprise data center or private or public cloud 102. This is also known as the data plane. Management packets or management traffic are packets that are being sent from the Edge 108 or Gateway 106 to the orchestrator 104 and includes heartbeat messages or flow statistics etc. This is also known as the management plane. In one example, both the control plane and the data plane pass through the gateway 106. In some examples, only the control traffic may be sent to the gateway 106 and the data plane may bypass the gateway 106 and go directly from the Edge 108 to the application server. FIG. 2 depicts a process 200 of a network link used to replace a 'last mile' connectivity (e.g. last MPLS, T1 etc.), according to some embodiments. The network links can be multiple consumer grade broadband links, private links (MPLS, etc.), WiFi networks or 3g/4g mobile links with the ability to perform process 200. In step 202 of process 200, network traffic can be identified using deep packet inspection to determine the application and/or application type of the traffic. Appropriate measures can be applied to ensure the QoS of the specific traffic based on the application, application type (realtime, transactional, bulk) and business priority of the traffic. For example, if the network traffic is identified as voice traffic which is high business priority, then forward error correction can be performed to reduce or eliminate packet loss. In another example, the network traffic can be identified as a bulk file transfer. In this example, the file transfer network traffic can be set as the lowest priority traffic and can use a small portion of bandwidth under contention or more bandwidth if no other traffic is in the network. Traffic identified as 'regular web browsing' (such as Facebook® and YouTube®) can be dropped out of the network altogether and sent over the regular Internet as it is not business critical. In step 204, bandwidth can be aggregated from all the links (e.g. a link can be a communications channel that connects two or more communicating devices). For example, bandwidth can be aggregated with a multipath transport layer protocol capable of 'striping' a traffic flow (e.g. flow of data packets from a source to a destination) across multiple paths between two peers (e.g. edge 108 and/or gateway 106). Traffic flow can be 'striped' across the multiple paths in one peer and 'gathered' at the other peer. In step 206, traffic on the links can be intelligently load balanced by sending successive packets belonging to the same flow (e.g. a traffic flow) on multiple links selected by an application aware intelligent link characterization and/or link selection. It is noted that the selected QoS based on the application can inform the selected links (e.g. whether to bind traffic to the best link, load balance or replicate traffic, etc.). The selected QoS can also determine whether the application is sensitive to loss and/or jitter. Based on the levels of loss and jitter in the network and the sensitivity of the traffic to them, a mitigation mechanism is put into play. In step 208, outages can be prevented using reliable, self-correcting data transfer to ensure in-order data delivery with the ability to maintain application persistence, as long as there is at least one active link, by sending packets belonging to the same flow on the active link(s). In step 210 errors on lossy links can be corrected using an error control mechanism for data transmission (e.g. Automatic Repeat-reQuest (ARQ) and/or forward error correction (FEC)) selectively based on the traffic identified and the current measured conditions in the network.

Figure 3:
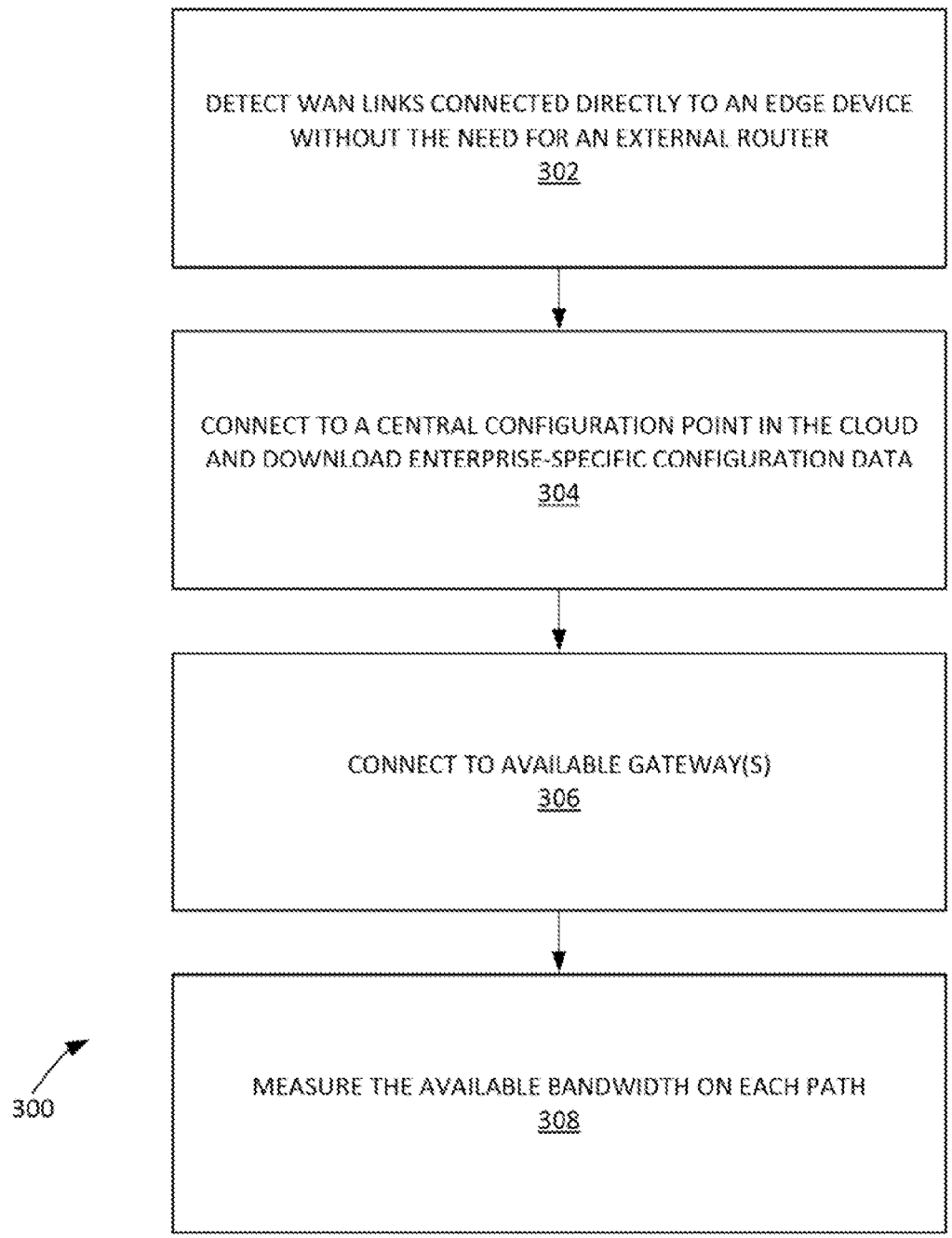
FIG. 3 depicts a process of removing the requirement for an IT administrator to configure each individual device in an enterprise computing network, according to some embodiments.

FIG. 3 depicts a process 300 of removing the requirement for an IT administrator to configure each individual device in an enterprise computing network, according to some embodiments. In step 302, WAN links that are connected directly to the edge device can be detected and measured without the need for an external router. In step 304, a central configuration point in the cloud can be connected to. Enterprise-specific configuration data, including available gateways, can be downloaded. In step 306, the available gateway(s) can be connected to by the entity in the cloud with the enterprise-specific configuration data. In step 308, an available bandwidth on each path can be measured.

A multipath (MP) protocol can implemented by combining multiple network paths into a composite connection that multiplexes packets from MP packet flows and control information (path quality, link characteristics, clock synchronization, etc.). An MP packet flow can map to a pair of internet protocol (IP) flows (e.g. one flow in each direction such as forward and reverse and between two endpoints). The MP packet flow can be identified by a set of parameters that describe a pair of IP flows (e.g. 5-tuple (the reverse path is described with source and destination swapped), namely: source IP address, destination IP address, source port, destination port, and the network layer 3 protocol identifier. In some examples, a multipath routing can include a routing technique of using multiple alternative paths through a network.

In effect every network layer 4 flow (e.g. a pair of layer 3 flows) (e.g. an application flow) can have a one-to-one mapping with the MP packet flow. In some embodiments, an, application flow and MP packet flow refer to the same notion. Each MP packet flow can be assigned an MP packet flow identifier. The MP packet flow identifier can be unique to the set of MP peers (e.g. peer 1 and/or peer 2 of FIG. 4). An MP node can aggregate connections from multiple MP peers sending MP packet flows to it (e.g. gateway(s) 106). The MP node can aggregate flow identifiers generated by the non-aggregation peer (e.g. edge device 108) that may not be unique.

Figure 4:
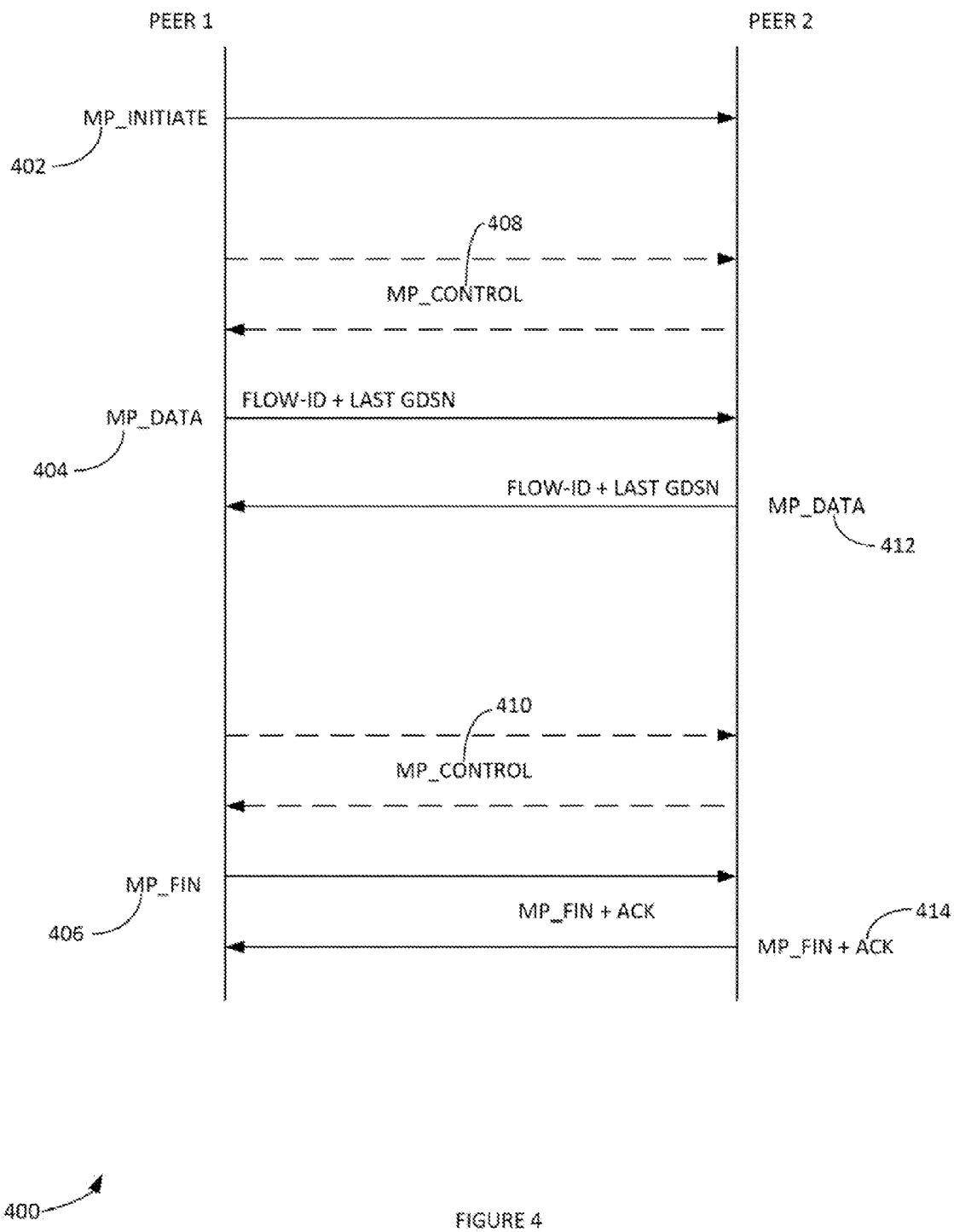
FIG. 4 illustrates an example flow sequence diagram for an MP packet flow, according to some embodiments.

In one example, at the time of first connection between two MP stacks, an MP_INITIATE message is passed which assigns a unique id that is used by the non-aggregation peer to ensure the flow id is unique at the aggregation point (see FIG. 4). In one example, this operation can be implemented to an identifier specific to the particular network of the non-aggregation peer.

FIG. 4 illustrates an example flow sequence 400 diagram for an MP packet flow, according to some embodiments. In one embodiment, peer 1 can be a client-side edge device and peer 2 can be a cloud-based gateway device. Peer 1 can transmit an MP_INITIATE 402 to peer 2. MP_CONTROL 408 (e.g. control information such as QoS parameters, treatment of data traffic flow parameters, etc.) can be exchanged between peer 1 and peer 2. Data packets can then be exchanged (e.g. MP_DATA 404 and MP_DATA 412). Data packets can include any user data. These data packets can be sequenced, numbered and sent across multiple links. When sent across multiple links, redundant copies of the packets are purged on receipt. Data packets can be acknowledged on return. Additional control data (e.g. MP_CONTROL) can be exchanged. MP_FIN 406 can initiate closing the MP packet flow session by peer 1. Peer 2 can provide MP_FIN+ACK 412 to acknowledge MP_FIN 406 can terminate session.

Figure 5:
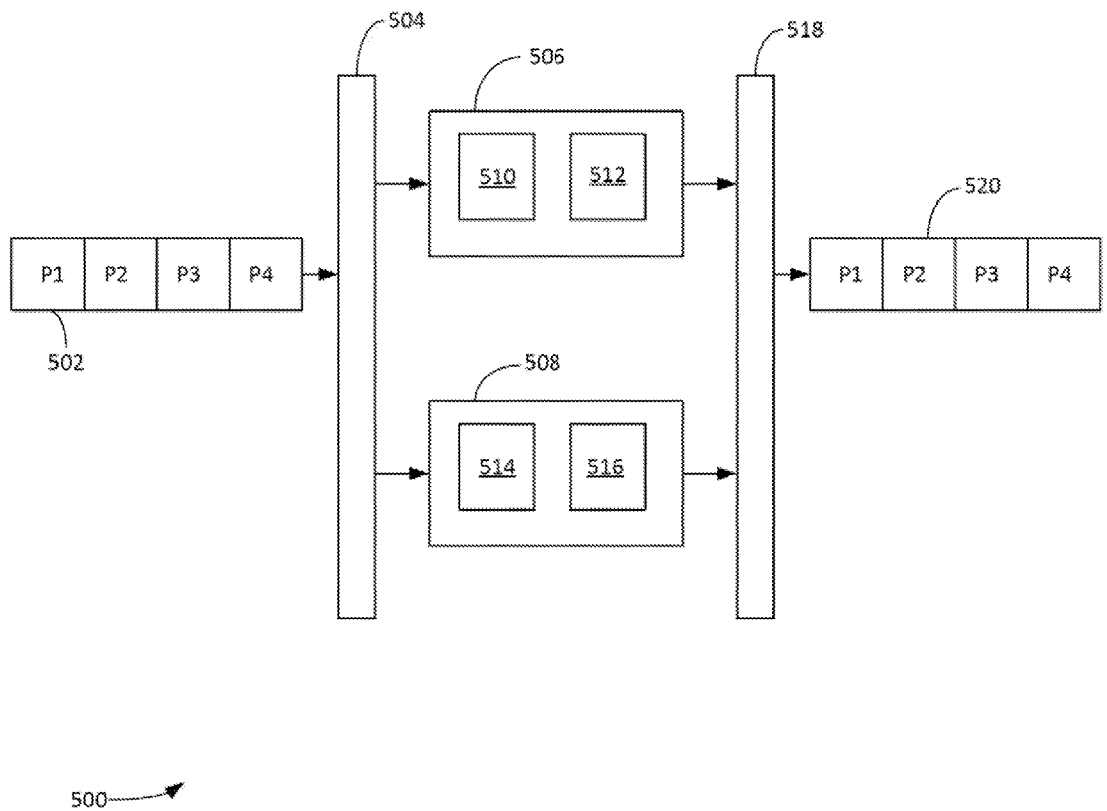
FIG. 5 illustrates an example MP process for bandwidth aggregation and data ordering, according to some embodiments.

FIG. 5 illustrates an example MP process 500 for bandwidth aggregation and data ordering, according to some embodiments. Process 500 can be used to intersession load balancing. In some embodiments, the MP stack can achieve bandwidth aggregation by sending successive packets belonging to the same MP packet flow on the different paths, to a peer MP stack. In some examples, different paths can be established on different links though this is not a limiting condition. For example, data packets 502 can be an application flow. Data packets 502 can be striped with a MP stripe 504 in one device (e.g. edge device 108).

Figure 6:
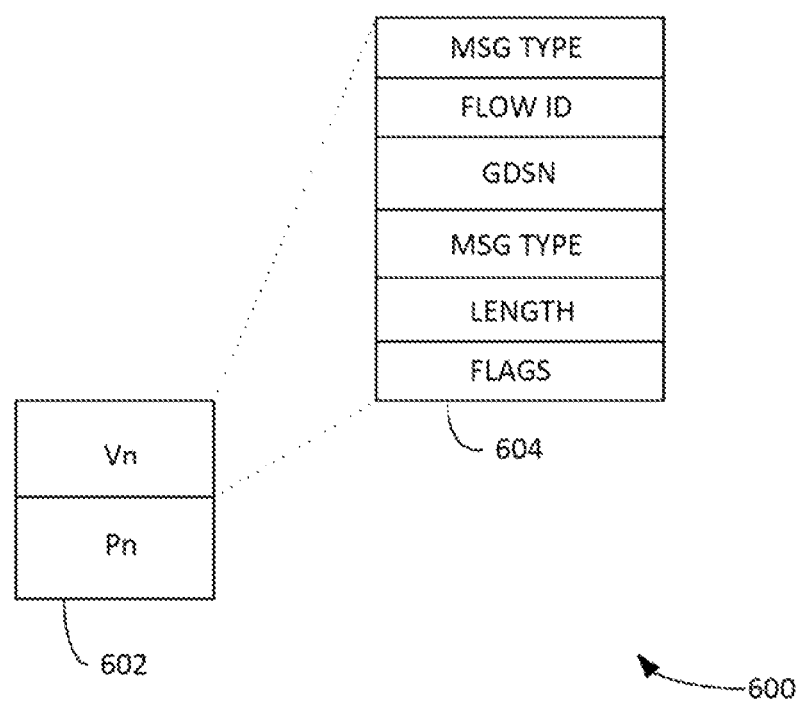
FIG. 6 illustrates an example of metadata in an MP header, according to some embodiments.

The endpoints (e.g. client and the application server) can infer this as an aggregated throughput as more packets are delivered to the endpoints in a given time window when compared to non-multipath case. MP process 500 can deliver ordered data 506 and 508 between two MP peers even if the data is sent on different paths between the peers. For example, successive data packets belonging to the same flow can be sent on different links with additional metadata. The metadata can identify data packet absolute offsets in the original flow. This metadata can be used to re-arrange the data back in order when the underlying application requires in-order data. In some applications (e.g. real-time collaboration applications) these reordering introduces latencies may be unacceptable. In these instances, data packets can be delivered in the same order of arrival. The application can handle ordering of data packets. This application awareness can be in the transport layer. This presence can be implemented on both sides of the network and enable interpretation of metadata and reassemble the data. This functionality can be selectively turned on/off based on detecting an application's particular requirements on receiving the ordered data 506 and 508. Additional headers, shown below, marked with MP headers 510 and 514 (e.g. "Vn") can be added. MP headers 510 and 514 can describe the data ordering along with other metadata (e.g. such as MP packet flow identifier, timestamps). FIG. 6 illustrates an example of metadata in an MP header, according to some embodiments. This metadata can enable the peer MP stack to receive the MP packet flows 506 and 508 (including striped data packets 512 and 516) from different paths in their order of arrival and re-arrange them in order to re-create the original flow of data packets 502 as data packets 520.

In one example, a Global Data Sequence Number (GDSN) can be the byte offset of the data with respect to the original application flow (e.g. data packets 502). GDSN can be used to reorder the data. Each MP packet can have the GDSN which is used by the peer MP stack to reorder the MP packet flow in an original order. Additionally, each peer can transmit the last seen GDSN on its stack for a given MP packet flow 'piggybacked' on an MP data packet. This last seen GDSN can be used to purge queues and re-transmit a missing GDSN. In the case the data transfer is half-duplex, then a MP_ACK message can be explicitly used to transmit the last seen GDSN to the other peer.

In the context of FIG. 4, during the closing of the MP packet flow 400, the MP_FIN 406 can be set by the peer that initiates the closing of the MP packet flow 400. The GDSN in this packet can be used by the other peer to acknowledge teardown via the MP_FIN+ACK 414 with a GDSN of 0.

An example method of traffic identification is now provided. An MP system can utilize an external deep packet inspection engine (and/or form of computer network packet filtering) to identify the application and application type of a given flow. This information can be used to determine the optimal MP packet flow settings to ensure the MP packet flow's QoS parameter. In cases where the application cannot be identified, an MP system can monitor the behavior of MP packet flows over time and attempt to derive the optimal settings for QoS. Future flows can be mapped to these new settings using IP address, port number, protocol, TOS/DSCP tag and destination hostname as the MP system learns optimal MP traffic parameters. Additionally, these settings which were obtained through this slow learning method (e.g. can include machine-learning methodologies such as neural networks, supervised learning, unsupervised learning, clustering, structured prediction, decision tree learning, reinforcement learning and the like) can be shared to all other edges in the network via the orchestrator 104 which can allow learning to be spread across an enterprise or the entire network of connected edges.

Deep packet inspection (DPI) can include examining the data part (and/or also the packet header, etc.) of a packet as it passes an inspection point, searching for protocol non-compliance, viruses, spam, intrusions, or defined criteria to decide whether the packet may pass or if it needs to be routed to a different destination, or, for the purpose of collecting statistical information. DPI can be performed with a DPI engine (e.g. Qosmos®, DPI engine, Dell™ SonicWALL™ Reassembly-Free Deep Packet Inspection™ (RFDPI) engine, etc.) and/or other packet analyser.

An example of path characterization and selection is now provided. An MP protocol can implicitly implement communicating an MP packet flow on multiple paths (e.g. on a set of underlying links). Consequently, an active path characterization that periodically measures the health of a path can be implemented. A cost function that computes a cost for each path based on the parameters measured in the health check can be implemented. A selection algorithm can be implemented that applies a set of constraints and chooses the path based on the path cost and the transmit algorithm determined.

An example of active path characterization is now provided. As a part of link characterization, the latency (e.g. one-way packet delay), jitter (e.g. packet delay variation), loss and available bandwidth on the path can be measured. To measure latency between two MP peers on a given path, a clock synchronization operation can be implemented in the MP peers. An example time synchronization protocol is now provided. Timestamp measurements can be sent continuously to whichever device is performing the role of master clock. The lowest difference in timestamps from a set of measurements can be used as a measure of the offset between the clocks. Backward time shifts which could influence measurements and computation can be avoided. The drift rate can be measured by observing the change in offset over time. Based on this drift rate, the interval between continuous measurements can be calculated to ensure that clocks will remain synchronized over time. Once the clocks are synchronized, the one-way receive latency and jitter can then be measured by sending a timestamped packet train.

In one example, multipath transport can handle and/or prevent congestion issues when the network paths are sufficiently diverse from a network topology standpoint. In these cases, the overall load on the individual paths can be reduced. On the other hand, diverse network paths can have diverse characteristics in terms of latency, throughput, loss and/or jitter. The load-balancing algorithm can send packets are on a 'best possible' link until the point the link is oversubscribed and/or there is loss on the link before switching to another path. When the network includes a wireline backbone (cable, DSL etc.), alternate paths can be utilized when available. On the other hand, with respect to networks with a wireless backbone (e.g. mobile, WiFi, WiMax, etc.), a packet drop may be an 'ephemeral' event that is short lived with relatively quicker recovery. In such a case, it may not be prudent to switch to alternate paths or clamp down the rate for this event without consideration of various other metrics. Thus, other metrics in addition to a loss value can be utilized. For example, a combination of parameters can be utilized, including, inter alia: the ECN flag (e.g. explicit congestion notification) set by an upstream router in an IP layer, a rate of acknowledgements received, a rate of loss in an interval of time to estimate the lossy value of a link, etc.

In one example, the cost of a MP path can be computed as the time taken for a data packet to reach one peer to another peer inclusive of such factors as scheduling and/or MP processing overheads. It is computed as the sum of the jitter, latency and processing delays. The path with the least cost with respect to a given a set of constraints (e.g. link level policies, application specific path usage policies etc.) can be selected accordingly.

An example MP path selection method is now provided. Based on the application and/or the current measured network conditions, the MP path(s) can be treated in various ways. In one example, the MP path can be load balanced such that each data packet selects the path with the lowest path cost and is transmitted on that path. In another example, the MP path can fixed such that the first packet selects the best path available. This path can be used as long it is available. If an active path characterization operation determines that the path is no longer available, a path selection operation can be performed again and the MP packet flow can migrate to a next best path. In yet another example, the MP path can be replicated across n-number paths based on such parameters as, inter alia: the importance of the application, bandwidth required and/or expected potential for packet loss in the network.

In one example, QoS can be ensured for an application by utilizing a combination of path selection methods such as those provided supra, as well as, network scheduling, packet reordering and/or error correction. For example, when an MP packet flow is initiated, an edge device (e.g. edge device 108) can identify the application and determine the proper QoS methods to be applied for this type of flow. The methods may or may not be symmetric (e.g. the same for the sender and receiver). Once the edge device determines the methods to be used, a control message can be sent to the gateway to ensure that the gateway (e.g. gateway(s) 106) in turn has information as to how to treat the MP packet flow (e.g. without having to do its own application identification). In the event the MP system (e.g. based on network conditions) and/or an administrator indicates that the methods should be changed, the edge device can again signal the gateway with a control message. The methods can be updated without interruption to the service or traffic. For example, upon receipt of the control message from the edge, the gateway can update the QoS methods of the flow without deleting the existing flow. As a result, the next packet to be sent can use the updated scheduling policies and link selection methods that were transmitted without interruption. For example, an MP packet flow that is being load balanced and is changed to replication as loss increases in the network can load balance packets 1-n until the control message is received. Packet flow can be a sequence of packets from a source computer to a destination, which may be another host, a multicast group, or a broadcast domain. Accordingly, packets beginning with n+1 can begin to be replicated. The gateway can be a multi-tenant gateway wherein multiple customers with edge devices can connect to the same gateway without actually exposing any of their data to each other. The multi-tenant gateway can implement a two-level hierarchical scheduler. In this case, a total egress bandwidth to the edge can be equally shared (e.g. in a work conserving manner) between all the connected edges at the top level (e.g. root level). The second level (e.g. a leaf) can schedule the MP packet flows belonging to a particular edge device rather than have resource limits defined for that edge device by the top level. To ensure that the scheduler does not hit processing limits for scheduling flows, the leaf level scheduler may not have per flow queues. Instead, a multiplexing algorithm can be utilized. The multiplexing algorithm can map a set of flows characterized by a set of parameters to a set of queues such that there is a many to one mapping between flows and queues.

In one example, SaaS applications may also directly interact with the software in the edge device (e.g. edge device 108 in FIG. 1) or gateway(s) (e.g. gateway 106 in FIG. 1). This can be done, for example, to query the health of the last-mile and to provision network bandwidth and characteristics in the last-mile to ensure QoS for the application. The edge device and/or the gateway(s) regardless of their embodiments provide APIs (application programming interfaces) that a SaaS application, with suitable permissions, can use to determine how the last-mile from the edge device to the gateway (e.g. in both directions) is performing. With this information the SaaS application may throttle back bandwidth so that the application continues to operate without congesting the network further and yet function reasonably well. By default, when an end-user accesses an application (which may run anywhere in the public cloud), the edge device identifies the application and determines the proper QoS methods to apply for this type of flow. As noted in supra, this includes network scheduling, packet reordering and/or error correction which is determined by policies set in the Orchestrator (e.g. orchestrator 104 in FIG. 1). The SaaS application may modify these policies dynamically to ensure that the end-user gets the best experience possible given the current last-mile characteristics.

Figure 7:
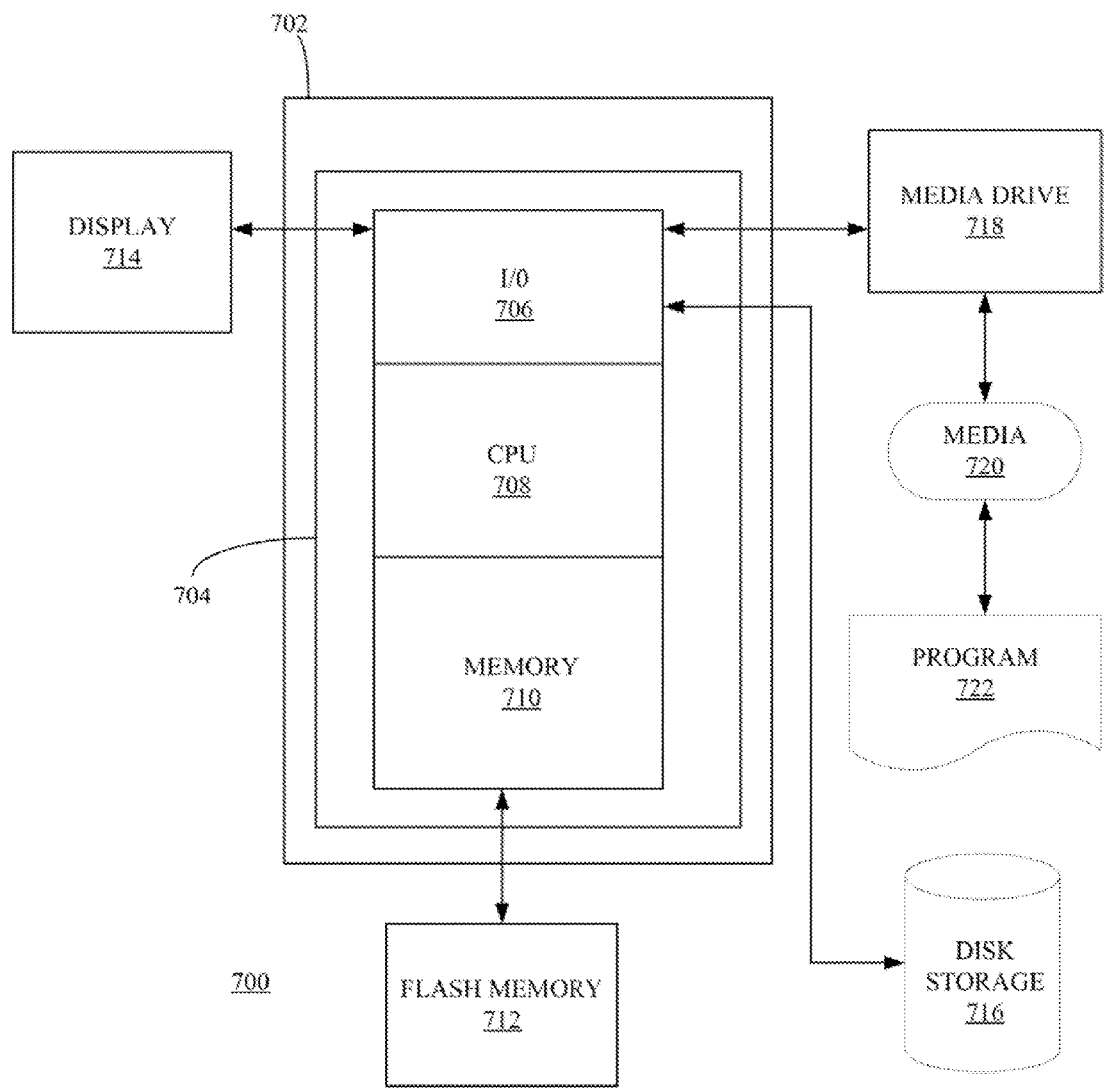
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a mother-board 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can include programs 722 and/or data.

Figure 8:
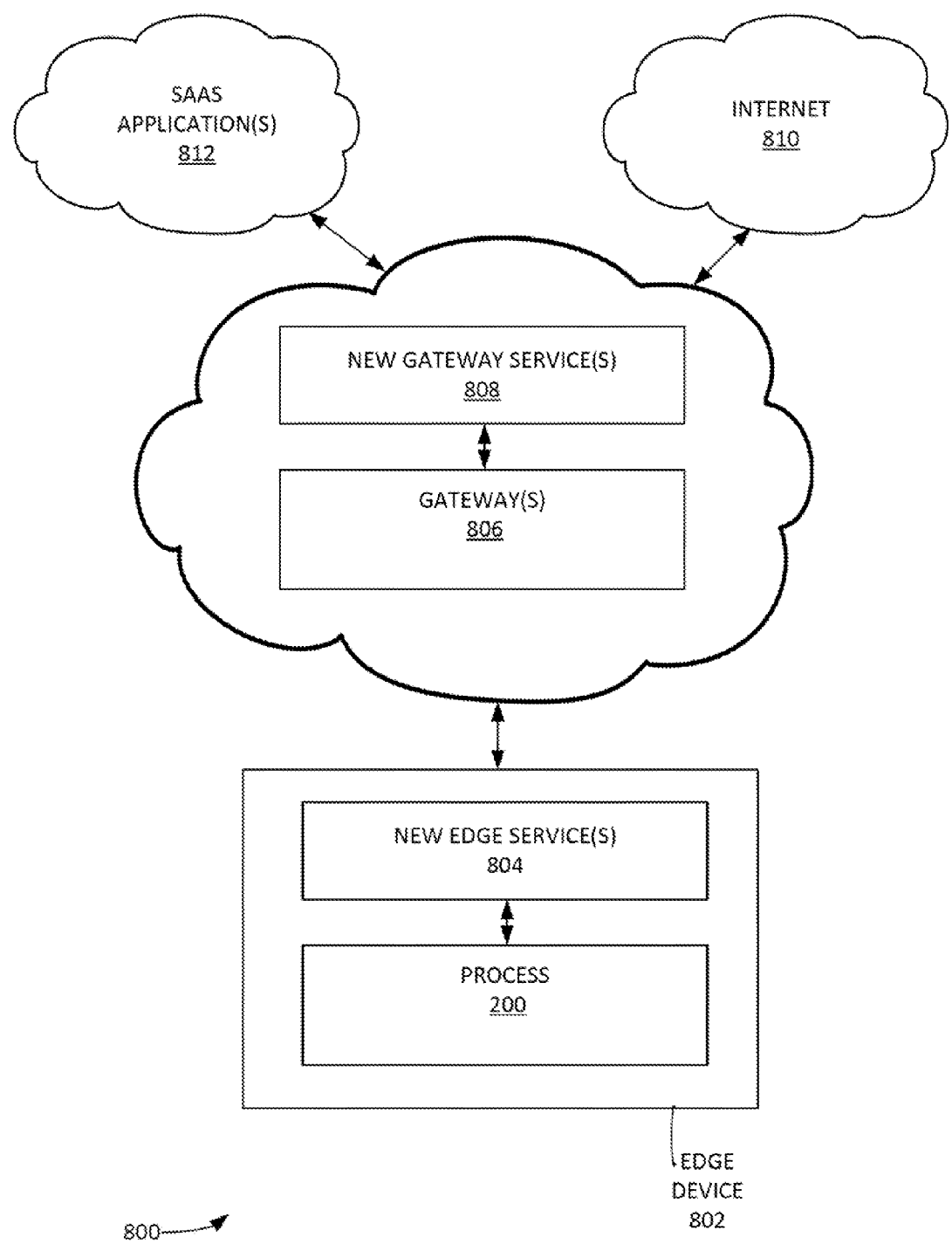
FIG. 8 illustrate an example of new services injected into the flow as it goes from the end user to the application in the public cloud, according to some embodiments.

FIG. 8 illustrate an example 800 of new services injected into the flow as it goes from the end user to the application in the public cloud, according to some embodiments. A public cloud can be a cloud with services rendered over a network that is open for public use. Additional information about process 200 can be found in the description of FIG. 2 supra. These services may operate on their own in the edge device 802 (e.g. edge device 108) or in the gateway(s) 806 within the same process or as a collection of processes both within the same machine or in separate machines. In another example of a service, a new edge device 804 and/or new gateway services 808 can work in conjunction with one another to provide an overall new service. It is noted that new gateway services 808 can go to the Internet 810 and/or a specified SaaS application 812. It is noted that the flow from the gateway can be through gateway services 808 and/or directly to the SaaS application 812.

Figure 9:
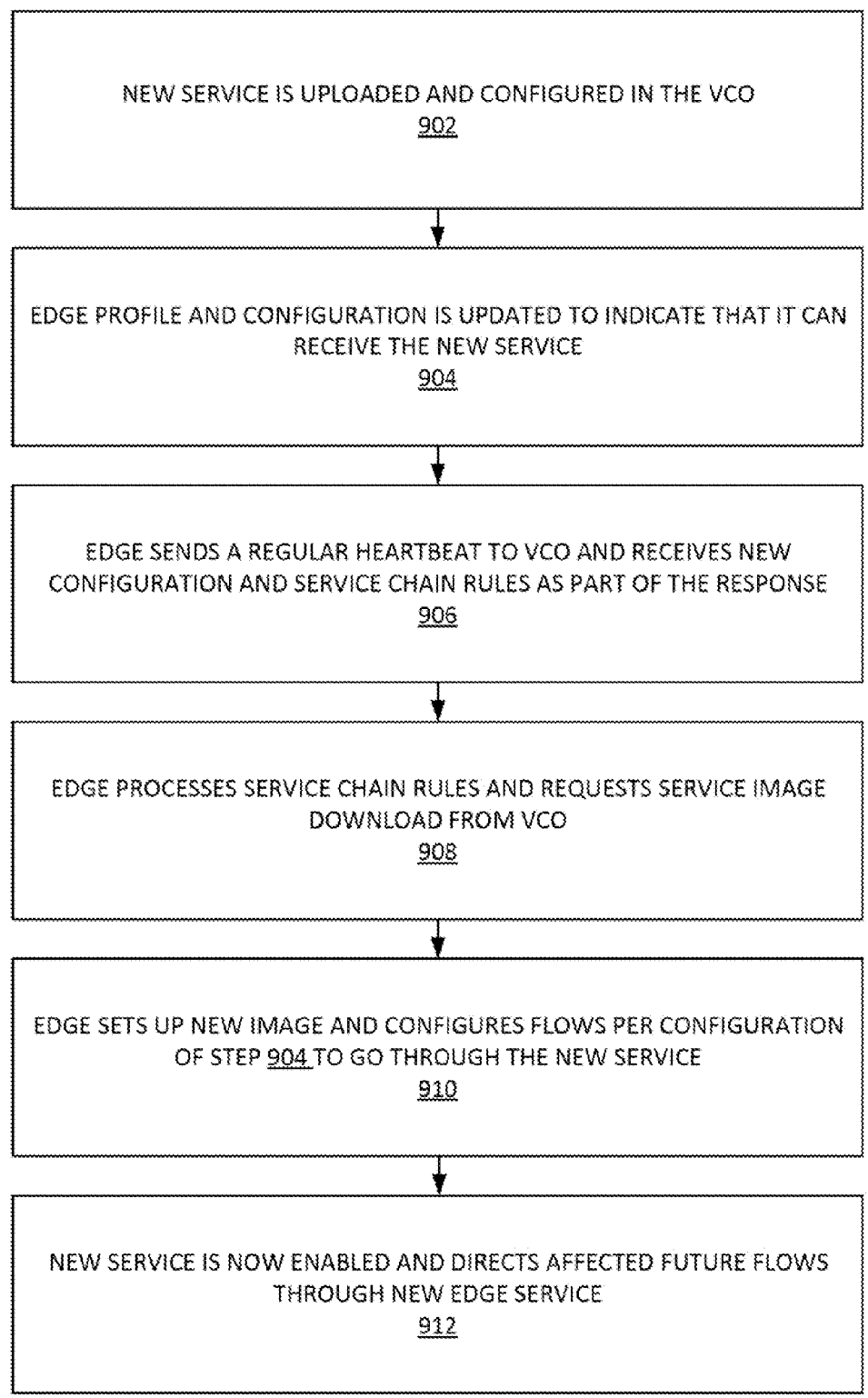
FIG. 9 depicts a process used to enable new services, according to some embodiments.

FIG. 9 depicts a process 900 used to enable new services, according to some embodiments. FIG. 9 depicts an edge 'service chaining' process. The new services can act independently in the edge device and/or the gateway(s) and in combination, according to various embodiments. Configuration and policies identify which flows are to be affected by the new services. In step 902 of process 900, a new service can be uploaded and configured in the Velocloud Orchestrator (104) (and/or other orchestrator such as orchestrator 104). In step 904, an edge profile and/or configuration can be updated to indicate that it can receive the new service. In step 906, an edge (e.g. an edge device) can send a regular heartbeat to the orchestrator 104 and/or receive a new configuration and/or service chain rules as part of the response. A heartbeat can be a periodic signal generated to indicate normal operation and/or to synchronize other parts of a system. In step 908, the edge processes the service chain rules and/or requests service image download from orchestrator 104.

In step 910, the edge sets up a new image and/or configures flows per configuration step 904 to go through the new service. For example, the edge can starts up the new image to instantiate the new service. Then, the edge can use the configuration rules to direct the network packets of the affected flows to pass through the new service.

In step 912, the new service can be enabled and direct all future flows through the new edge service. It is noted that 'service chain' can be any one of the following combinations, inter alia: service runs only on the edge and affected flows go through this new service; service runs only on the gateway as a virtual machine (VM) and affected flows from the affected edges are sent to the new service VM; service runs only in a SaaS application and affected flows from the affected edges are sent to the new service; any combination of the above while any of the steps are optional, the order is maintained.

A service image can be a process, virtual machine and/or an implementation which can receive a network packet and/or a series of network packets belonging to the affected flows. The service image can then take some action, such as, inter alia: modifying the packet in a certain manner to provide additional functionality. For example, the service image may drop network packets which it determines have some virus and/or are a part of an attacked network. In another example, the service image may compress the contents of multiple packets on the Edge and decompress the packets on the gateway side to increase the effective bandwidth of the link between the Edge and the Gateway. In another example, the service image may identify the flow by inspecting the contents of the packet (e.g. deep packet inspection).

Figure 10:
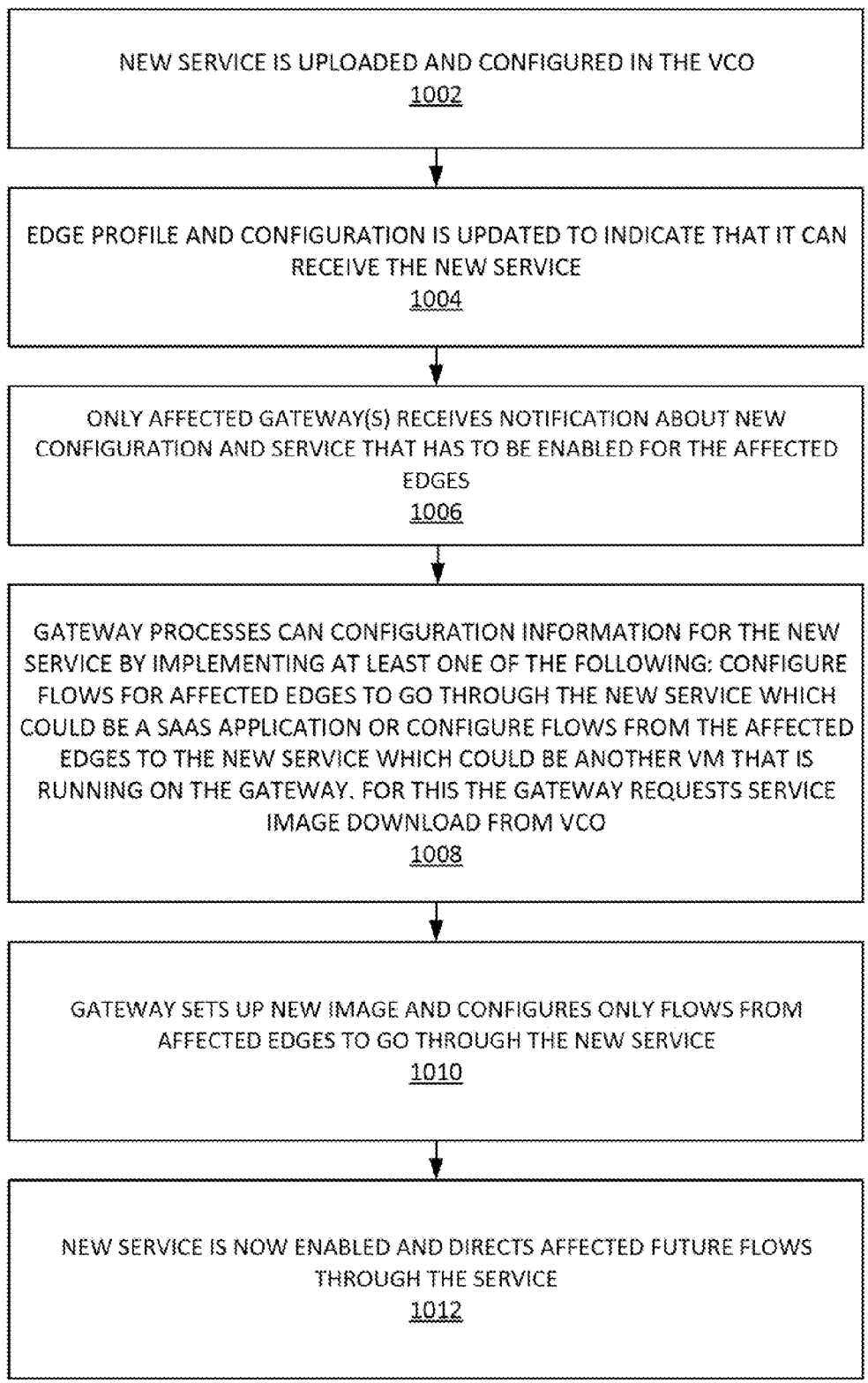
FIG. 10 depicts another example process used to enable new services, according to some embodiments.

FIG. 10 depicts another example process 1000 used to enable new services, according to some embodiments. FIG. 10 depicts a gateway 'service chaining' process. In step 1002 of process 1000, a new service can be uploaded and configured in the orchestrator 104. In step 1004, an edge profile and/or configuration can be updated to indicate that it can receive the new service. In step 1006, the affected gateway(s) receive notification about new configuration and service that has to be enabled for the affected edges. In step 1008, the gateway processes can configure information for the new service. This can be done in following manner. Flows can be configured for affected edges to go through the new service which could be a SaaS application (e.g. as shown in FIG. 8). Flows can be configured from the affected edges to the new service that can be another VM that running on the gateway. For this example, the gateway requests service image can be downloaded from orchestrator 104. In step 1010, the gateway can set up new image and/or configure flows from affected edges to go through the new service. In step 1012, the new service can be enabled and direct future flows through the service.

B. Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. An edge-gateway muitipath method comprising:
    providing an edge device in a local network communicatively coupled with a cloud-computing service in a cloud-computing network;
    automatically detecting a set of wide area network (WAN) links connected directly to the edge device or via an intermediate router;
    automatically measuring the bandwidth of the WAN links communicatively coupling the edge device with a central configuration point in the cloud-computing network;
    downloading, from the central configuration point, an enterprise-specific configuration data into the edge device, wherein the enterprise-specific configuration data comprises a gateway information;
    communicatively coupling the edge device with a gateway in the cloud-computing network, wherein the communicatively coupling of the edge device with the gateway comprises a rnultipath (MP) protocol, and wherein the MP protocol is implemented by combining a set of multiple network paths into a composite connection that transmits a set of data packets from a single user packet flow across all oaths simultaneously;
    measuring an available bandwidth on each path of the set of multiple network paths between the edge device and the gateway;
    utilizing a deep-packet inspection engine to identify an application and an application type in a MP network flow;
    determining an optimal multipath network flow setting that ensures a quality of service (QoS) parameter of the multipath network flow; and
    setting another MP network flow parameter based on the optimal multipath network flow setting.

2. The edge-gateway multipath method of claim 1, wherein the cloud-computing network comprises a public cloud network.

3. The edge-gateway multipath method of claim 1, wherein the edge device comprises a virtual machine edge device.

4. The edge-gateway multipath method of claim 1, wherein the gateway is deployed as a virtual machine gateway.

5. The edge-gateway multipath method of claim 1, wherein the gateway comprises a network node equipped for interfacing with another network utilizing different communication protocols.

6. The edge-gateway multipath method of claim 1,
   wherein a software as a service (SaaS) application interacts with the edge device and the gateway to determine a value of a specified network characteristic communicatively coupling the SaaS application with the edge device and resetting the QoS parameter based on the value of the specified network characteristic.

7. A computerized system comprising:
   a processor configured to execute instructions;
   a memory containing instructions when executed on the processor, causes the processor to perform operations that:
      provide an edge device in a local network communicatively coupled with a cloud-computing service in a cloud-computing network;
      automatically detect a set of wide area network (WAN) links connected to the edge device;
      automatically measure the WAN links without using an external router;
      communicatively couple the edge device with a central configuration point in the cloud-computing network;
      download, from the central configuration point, an enterprise-specific configuration data into the edge device, wherein the enterprise-specific configuration data comprises a gateway information;
      communicatively couple the edge device with a gateway in the cloud-computing network, wherein the communicatively coupling of the edge device with the gateway comprises a multipath (MP) protocol, and wherein the MP protocol is implemented by combining a set of multiple network paths into a composite connection that transmits a set of data packets from a single user packet flow across all paths simultaneously;
      measure an available bandwidth on each path of the set of multiple network paths between the edge device and the gateway; and
      utilize a deep-packet inspection engine to identify an application and an application type in a MP network flow.

8. An edge-gateay multipath network system comprising:
   an edge device in a local network communicatively coupled with a cloud-computing service in a cloud-computing network, wherein, upon installation, the edge device automatically detects a set of wide area network (WAN) links connected to the edge device, wherein the edge device automatically measures the WAN link attributes, wherein the edge device downloads, from an orchestrator, an enterprise-specific configuration data and a set of service chain rules, wherein the enterprise-specific configuration data comprises a gateway information, wherein the edge device is communicatively couple the orchestrator, and wherein the edge device communicatively couples with a gateway in the cloud-computing network based on the enterprise-specific configuration data and the set of service chain rules, and wherein the communicatively coupling of the edge device with the gateway comprises a multipath (MP) protocolprotocol, and wherein the MP protocol is implemented by combining a set of multiple network paths into a composite connection that transmits a set of data packets from a single user packet flow across all paths simultaneously, wherein the edge device measures an available bandwidth on each path of the set of multiple network paths between the edge device and the gateway, and wherein the edge device utilizes a deep-packet inspection engine to identify an application and an application type in a MP network flow;
   the orchestrator comprising a central configuration point in the cloud-computing network, wherein the orchestrator receives a heartbeat communication from the edge device and communicates the enterprise-specific configuration data and the set of service chain rules to the edge device as a response;
   a gateway comprising a network node equipped for interfacing with another computer network utilizing different communication protocols, wherein the gateway is implemented with the cloud-computing service, wherein the gateway has no initial setup configuration, wherein the edge device passes an enterprise identification of the edge device and a local configuration to the gateway, wherein the gateway uses the initial setup configuration to automatically create multiple isolated configurations-per-enterprise, and wherein the gateway is deployed as a virtual machine gateway.

9. The edge-gateway multipath network system of claim 8;
   wherein the edge device identifies an application and determines the proper quality of service (QoS) methods to apply with respect to the application when the edge device initially communicatively couples with the gateway and communicates a control message to the gateway.

10. The edge-gateway muitipath network system of claim 9, wherein upon receipt of the control message from the edge device, the gateway updates a Qos network parameter of the network flow without deleting a current network flow.

11. The edge-gateway multipath network system of claim 8, wherein the edge device comprises a virtual machine edge device.

* * * * *

(12) POST-GRANT REVIEW CERTIFICATE (197th)
United States Patent
Mukundan et al.

(10) Number: US 9,722,815 J1
(45) Certificate Issued: Aug. 17, 2021

(54) EDGE-GATEWAY MULTIPATH METHOD AND SYSTEM

(71) Applicants: Sunil Mukundan; Stephen Craig Connors; Steven Michael Woo; Ajit Ramachandra Mayya; Thomas Harold Speeter

(72) Inventors: Sunil Mukundan; Stephen Craig Connors; Steven Michael Woo; Ajit Ramachandra Mayya; Thomas Harold Speeter

(73) Assignee: VELOCLOUD NETWORKS, LLC

Trial Number:

PGR2018-00063 filed May 1, 2018

Post-Grant Review Certificate for:

Patent No.: 9,722,815
Issued: Aug. 1, 2017
Appl. No.: 14/321,818
Filed: Jul. 2, 2014

The results of PGR2018-00063 are reflected in this post-grant review certificate under 35 U.S.C. 328(b).

POST-GRANT REVIEW CERTIFICATE
U.S. Patent 9,722,815 J1
Trial No. PGR2018-00063
Certificate Issued Aug. 17, 2021

AS A RESULT OF THE POST-GRANT REVIEW PROCEEDING, IT HAS BEEN DETERMINED THAT:

Claim 7 is found patentable.

Claims 1-6 and 8-11 are cancelled.

\* \* \* \* \*